United States Patent
Wu et al.

(10) Patent No.: US 8,150,423 B2
(45) Date of Patent: *Apr. 3, 2012

(54) PAGING GROUP NETWORK AND METHOD FOR UPDATING MOBILE STATION LOCATIONS

(75) Inventors: Jianjun Wu, Shenzhen (CN); Yong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,567

(22) Filed: Mar. 29, 2011

(65) Prior Publication Data

US 2011/0189976 A1 Aug. 4, 2011

Related U.S. Application Data

(63) Continuation of application No. 12/134,820, filed on Jun. 6, 2008, now Pat. No. 7,983,697, which is a continuation of application No. PCT/CN2006/003328, filed on Dec. 7, 2006.

(30) Foreign Application Priority Data

Dec. 7, 2005 (CN) .......................... 2005 1 0129398

(51) Int. Cl.
*H04W 68/00* (2009.01)
(52) U.S. Cl. ..................... 455/458; 455/433; 455/525
(58) Field of Classification Search .............. 455/458, 455/525, 433, 432.1, 411
See application file for complete search history.

(56) References Cited

U.S. PATENT DOCUMENTS

| 5,713,073 | A | 1/1998 | Warsta |
| 7,633,904 | B2 * | 12/2009 | Venkatachalam ............. 370/331 |
| 2004/0157619 | A1 * | 8/2004 | Corson et al. .............. 455/456.1 |
| 2005/0037803 | A1 | 2/2005 | Friman |
| 2005/0250474 | A1 | 11/2005 | Hong et al. |
| 2005/0265360 | A1 | 12/2005 | Kim et al. |
| 2006/0009241 | A1 | 1/2006 | Ryu |
| 2006/0009242 | A1 | 1/2006 | Ryu |
| 2006/0099972 | A1 * | 5/2006 | Nair et al. .................... 455/458 |
| 2007/0087767 | A1 | 4/2007 | Pareek et al. |

(Continued)

FOREIGN PATENT DOCUMENTS

CN 1135826 A 11/1996

(Continued)

OTHER PUBLICATIONS

International Search Report in corresponding PCT Application No. PCT/CN2006/003328 (Mar. 22, 2007).

(Continued)

*Primary Examiner* — Lewis West
(74) *Attorney, Agent, or Firm* — Leydig, Voit & Mayer, Ltd.

(57) ABSTRACT

A paging group network includes multiple paging groups formed by areas covered by base stations (BSs). The paging group network further includes an anchor paging controller (PC) and a relay PC. The anchor paging controller initiates a page to a mobile station (MS), addresses the paging group in which the MS is located, and stores status information about the MS in a corresponding location register (LR). The relay PC manages the paging groups. A method for updating MS locations is also provided. Thereby, the present invention optimizes the paging and location updating processes, and reduces the complexity of managing the idle mode.

18 Claims, 6 Drawing Sheets

U.S. PATENT DOCUMENTS

2007/0105567 A1  5/2007  Mohanty et al.
2007/0218926 A1* 9/2007  Zhuang et al. ................ 455/466

FOREIGN PATENT DOCUMENTS

| CN | 1592480 A | 3/2005 |
| --- | --- | --- |
| CN | 1980466 B | 11/2010 |
| EP | 1 534 031 A2 | 5/2005 |
| WO | WO 00/35215 A2 | 6/2000 |
| WO | WO 01/97549 A1 | 12/2001 |
| WO | WO 2007/056515 A2 | 5/2007 |

OTHER PUBLICATIONS

U.S. Appl. No. 12/134,820 (Aug. 5, 2011).

U.S. Appl. No. 12/818,897 (Aug. 5, 2011).

1$^{st}$ Office Action in corresponding Chinese Application No. 200510129398.X (May 8, 2009).

Rejection Decision in corresponding Chinese Application No. 200510129398.X (Dec. 11, 2009).

1$^{st}$ Office Action in corresponding Euopean Application No. 06828271.4 (Feb. 19, 2009).

1$^{st}$ Office Action in corresponding U.S. Appl. No. 12/818,897 (Oct. 20, 2010).

Final Office Action in corresponding U.S. Appl. No. 12/818,897 (Jan. 3, 2011).

Written Opinion of the International Searching Authority in corresponding PCT Application No. PCT/CN2006/003328 (Mar. 22, 2007).

"WiMAX End-to-End Network Systems Architecture—Stage 2: Architecture Tenets, Reference Model and Reference Points," Nov. 29, 2005, Draft, WiMAX Forum, Beaverton, Oregon.

* cited by examiner

PAGING GROUP NETWORK AND METHOD FOR UPDATING MOBILE STATION LOCATIONS

CROSS-REFERENCE TO RELATED APPLICATIONS

This application is a continuation of U.S. patent application Ser. No. 12/134,820, filed on Jun. 6, 2008, which is a continuation of International Application No. PCT/CN2006/003328, filed on Dec. 7, 2006, which claims priority to Chinese Patent Application No. 200510129398.X, filed on Dec. 7, 2005, all of which are hereby incorporated by reference in their entireties.

FIELD OF THE INVENTION

The present invention relates to the communication field, and more particularly to a paging group network and a method for updating mobile station (MS) locations.

BACKGROUND

Idle mode is a working mode of mobile station (MS) in a mobile broadband wireless access system defined in IEEE 802.16e. In the idle mode, an MS moves in a very large area, and receives downlink broadcast service messages in a certain period interval. The MS is informed by the broadcast messages whether there is a downlink service to be sent. When roaming in the area, the MS does not need to register with a base station (BS) of the cell which it is roaming in. Meanwhile, when the MS roams to different cells, it is unnecessary to perform normal operation processes such as a handover, so the idle mode saves the power of the MS and air interface resources.

The areas covered by BSs may form a group named paging group. The paging group aims to constitute a continuous area. In the continuous area, the MS does not need to send uplink services, but may determine whether there are downlink services sent to the MS by a downlink paging channel. The paging group must be large enough to make sure most MSs remain in the same paging group in a long time period; at the same time, the paging group must be small enough to make sure the overhead of paging the MSs is reasonable in a paging group.

In the normal operation with a serving BS, an MS may enter the idle mode by sending a message request. Similarly, the serving BS may also request the MS to enter the idle mode by sending a message to the MS. Regardless of whether the MS forwardly initiates a request to enter the idle mode or the serving BS sends a message to request the MS initially to enter the idle mode, the MS needs to finish registering and entering the idle mode in a set period.

A paging reference model in the idle mode is defined in the WiMAX Worldwide Interoperability Microwave Access standard which is being constituted right now. A paging controller (PC) is a network entity capable of controlling activities of the MSs in the idle mode. The entity is a logic entity in the current WiMAX network architecture, and is closely associated with another logic entity, i.e., the authenticator (the PC may be realized in the same physical network element (NE) as a part of the logic function of the authenticator). The physical location of the PC is either a physical NE access service network gateway (ASN GW) of the WiMAX network or another independent physical NE. In addition, as the PC needs to initiate a paging message according to the paging group in which the current MS is located, a location register (LR) is required to store status information of the MS, paging information, and information related to service flows. Generally, a PC logic entity is corresponding to an LR logic entity, and the two logic entities are realized in the same physical NE.

Suppose other physical NEs and logical entities in the WiMAX network are not considered, FIG. 1 is a schematic diagram of a paging group network in a WiMAX network according to the conventional art. The WiMAX paging reference model according to FIG. 1 is adopted in the following technical descriptions, and the technology of the present invention includes, but is not limited to, applications in a WiMAX system.

According to the paging reference model of FIG. 1, when the MS initially requests to enter the idle mode on BS1 (Serving BS), or when BS1 instructs the MS to enter the idle mode, through the message interaction between the MS and BS1 and the message interaction between BS1 and the ASN GW (a rear NE), the PC is informed that the MS enters the idle state, wherein informing the PC is realized in ASN GW1, and the status information, paging information, and service flow information of the MS are stored in the corresponding LR. The MS may carry the information which needs to be reserved when entering the idle mode in the idle model request message sent to BS1, and BS1 may also configure similar information in an idle mode response message, adapted to inform the MS of the related information stored in the LR by the MS and the PC ID. The PC involved in the above process is an anchor paging controller (PC) serving the MS. In addition, after the MS enters the idle mode, corresponding R4 and R6 interfaces need to be released, but an R3 interface between the home agent (HA) and foreign agent (FA) needs to be reserved.

According to the above scheme, when the network needs to page the MS in the idle state, the ASN GW in which the FA is located queries information related to the MS from the ASN GW in which the anchor PC/LR is located. The anchor PC/LR obtains the paging group in which the current MS is located according to the location record, and queries about the ASN GW in which PC is located that belongs to the paging group. The APC sends a message of paging the MS to the ASN GW in which the relay PCs related to the paging group is located. The anchor PC is required to configure and manage all possible paging group information in this scheme. As each PC may be the anchor PC of a different MS, all of the PCs need such configuration and management, the data configuration volume is very large, and the management is complicated.

According to the above scheme, in the idle mode, the MS needs to initiate periodically a location updating request message over air interface to the current BS in which the MS is located. After receiving the message, the BS sends a location updating message about the rear network to the corresponding PC according to the PC ID in the message. The PC determines whether the MS enters a new paging group according to the message; and if the MS enters a new paging group, the corresponding information in the LR is updated.

The disadvantages of the above scheme are as follows:
1) The grouping of the paging groups is not limited or specified, causing the anchor PCs to need to configure and manage all possible paging groups. FIG. 2 is a schematic diagram of another conventional paging group network. As shown in FIG. 2, both paging group1 and paging group3 involve two ASN GWs. Thus, when data is delivered to the paging group in which an MS is located, the PC needs to deliver the paging message to multiple ASN GWs of the paging group in which the MS is located.

2) In a conventional system, the corresponding relationship between the paging groups and the ASN GWs need to be configured in the LR, thus resulting in unnecessary configuration and maintenance. In the situation of the paging group division shown in FIG. 2, the PC/LR needs to maintain the ASN GW information corresponding to each paging group. Otherwise, when a paging message needs to be sent to a certain MS, the PC does not know which ASN GW the paging message should be delivered to.

SUMMARY

The embodiments of present invention provide a paging group network and a method for updating MS locations, adapted to solve the problems of complicated management of paging groups by PCs and complex configuration data in the LR.

The paging group network includes multiple paging groups, wherein the paging groups are formed of multiple areas covered by BSs. The paging group network further includes:

an anchor paging controller (PC), adapted to initiate a paging to a mobile station (MS), address a paging group in which the MS is located, and store status information about the MS in a corresponding location register (LR); and a relay PC, adapted to manage the paging group.

The method for updating mobile station (MS) locations by adopting the paging group network includes the following steps:

Step 1: a serving BS sends an MS location updating request to a relay PC controlling the serving BS;

Step 2: the relay PC sends the location updating request to an anchor PC, and assigns a new paging group to the MS;

Step 3: the relay PC sends a location updating response carrying the new paging group information to the serving BS; and Step 4: the anchor PC modifies information stored in a location register (LR) according to a result of location updating.

The embodiments of present invention optimize the paging and location updating processes, and reduce the management complexity of the idle mode.

BRIEF DESCRIPTION OF THE DRAWING(S)

DETAILED DESCRIPTION

Embodiments of the present invention are described below with reference to the accompanying drawings.

Figure 1:
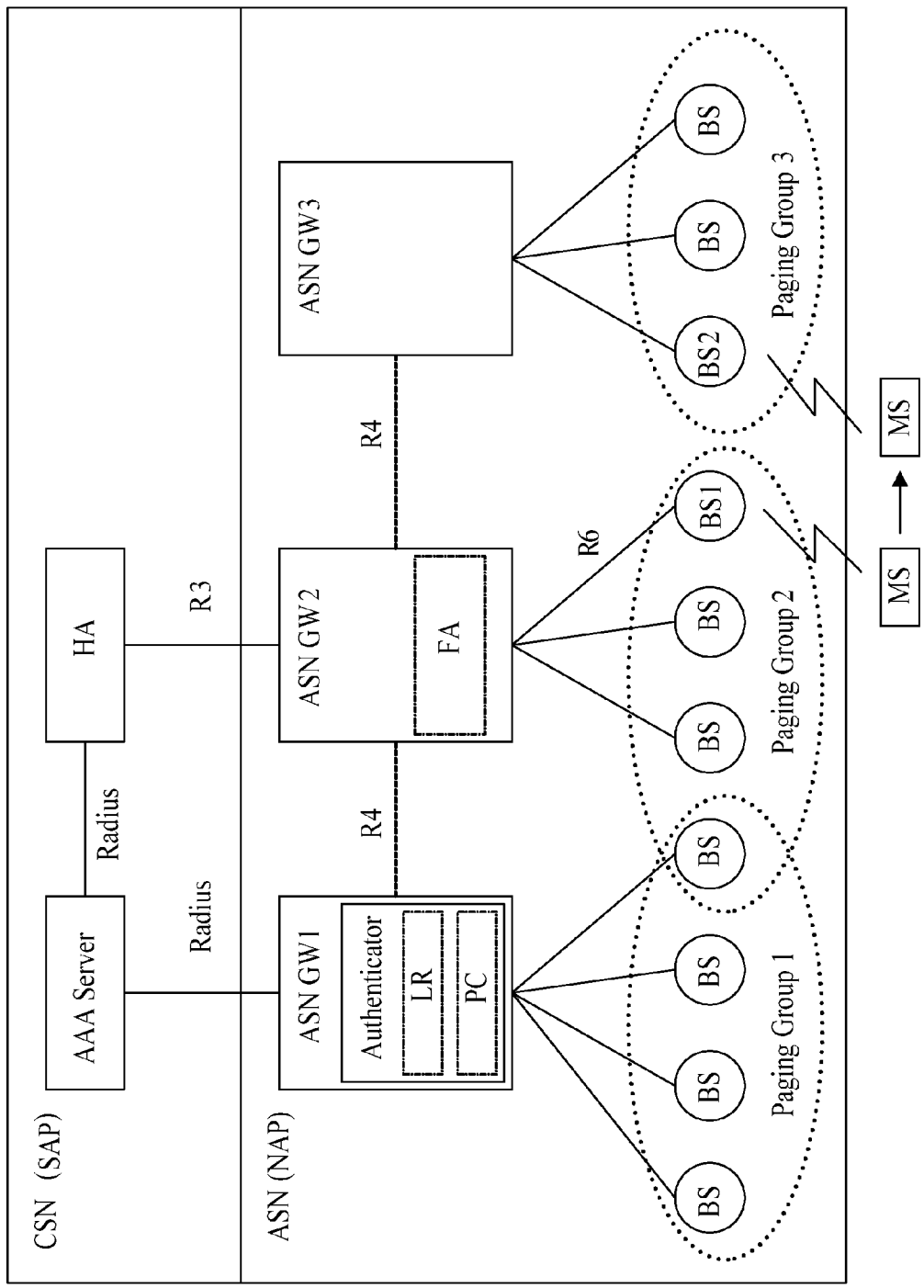
FIG. 1 is a schematic diagram of a paging group network in a conventional WiMAX network.
Figure 2:
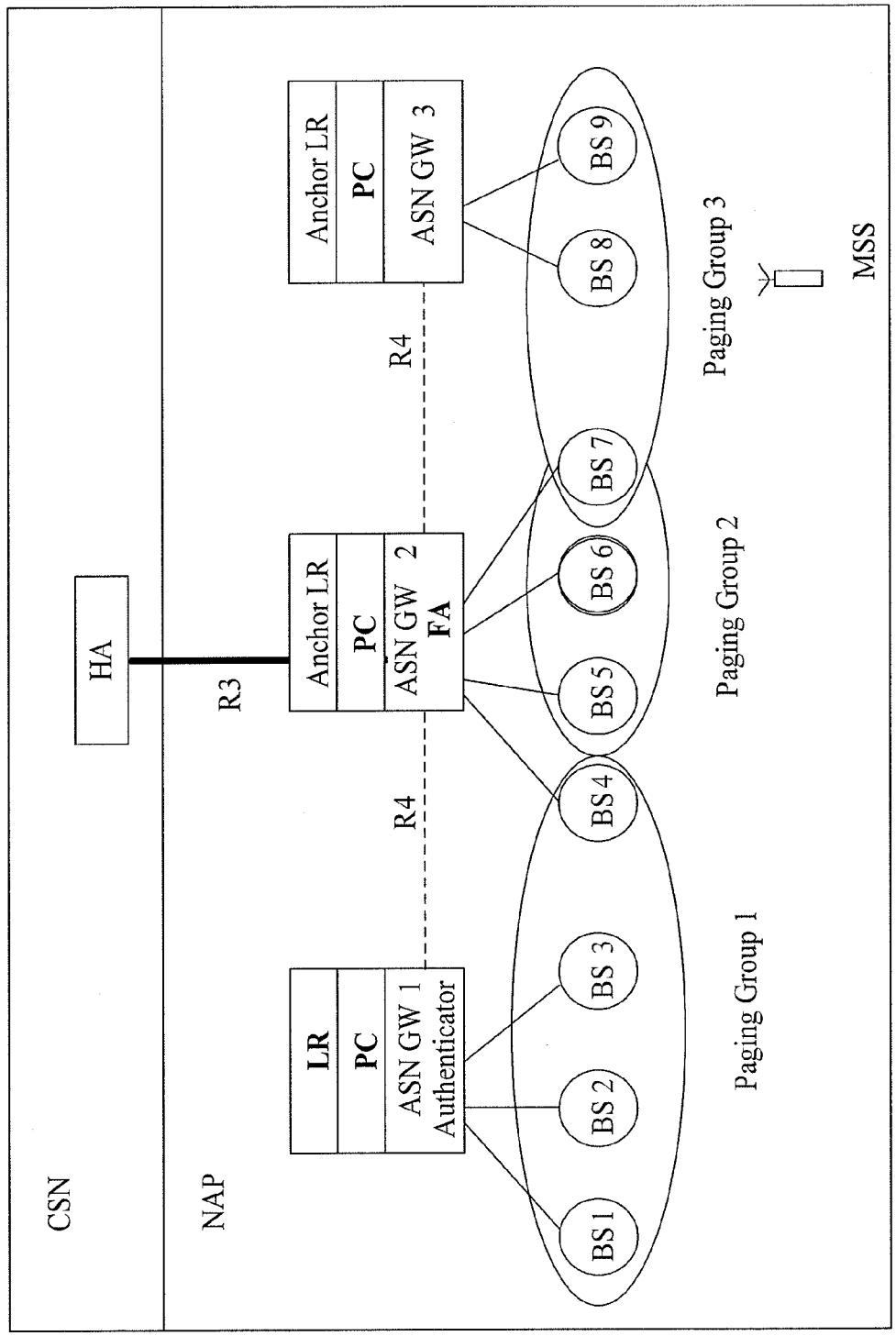
FIG. 2 is a schematic diagram of another conventional paging group network.
Figure 3:
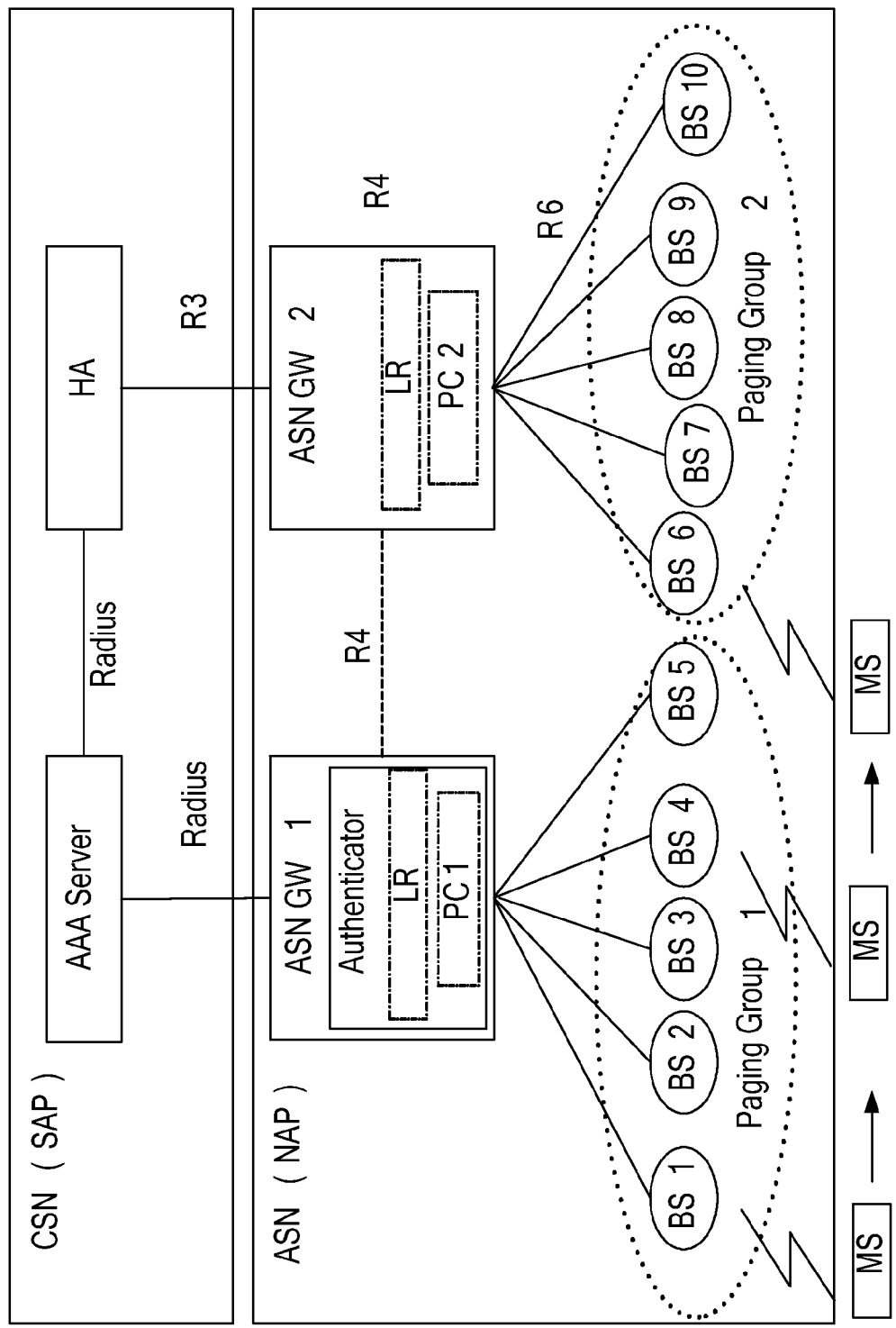
FIG. 3 is a schematic structural diagram of a paging group network according to an embodiment of the present invention.

FIG. 3 is a schematic structural diagram of a paging group network according to an embodiment of the present invention. As shown in FIG. 3, in the paging group network according to the embodiment of the present invention, a paging group may include multiple areas covered by BSs, a paging group is managed by a specific PC, and a PC manages some specific paging groups. In the idle mode, the anchor PC is only responsible for the paging control function on the MS, addressing the area where the MS is, controlling related processes of paging the MS, initiating a paging of the MS, knowing the result of location updating, and storing information related to the idle state of the MS (in the corresponding LR). The detailed management of a paging group is performed by the current relay PC in charge of the paging group.

The relay PC is adapted to act as an agent, forward and process the processes related to the MS location updating, and inform the anchor PC of the result of the location updating. The relay PC appears when the MS moves to a new paging group out of the control of the original anchor PC.

This scheme further includes that a paging group may be managed by multiple relay PCs.

The anchor PC may also function as a relay PC for managing a certain paging group in this scheme, equivalent to a special situation that, for a paging group in which an MS is located, the relay PC which manages the paging group is also an anchor PC which is responsible for addressing the MS and storing the status information of the MS.

By the above paging group network, optimizing the paging and location updating processes and reducing the complexity of managing the idle mode may be realized. An example of the paging group network is given below.

FIG. 3 is a schematic structural diagram of a paging group network according to an embodiment of the present invention. As shown in FIG. 3, two paging groups, i.e., paging group1 and paging group2, are set. The paging group1 includes BS1 to BS5, and the paging group2 includes BS6 to BS10. Meanwhile, two PCs, i.e., PC1 and PC2, are set in the paging group network. PC1 and PC2 function as the relay PCs of paging group1 and paging group2, respectively.

At first, the MS is located in BS1, and enters the idle mode from BS1. BS1 is managed by PC1. At this time, PC1 is the anchor PC of the MS in the idle mode. When the MS moves to BS4 in the idle mode, the location of the MS needs to be updated. However, as BS4 is also managed by PC1, in the location updating process, the MS only interacts with PC1, which is the anchor PC of the MS. The designation of a new paging group and possible parameter settings are managed by the anchor PC.

However, when the MS moves to BS6, the location of the MS is updated. As BS6 is managed by PC2, the MS needs to interact with both PC1 and PC2 during the location updating process. At this time, PC1 is still the anchor PC of the MS, and PC2 is also the relay PC of the MS. In this process, the new paging group of the MS is specified by PC2, i.e., the relay PC. If the paging cycle and paging offset need to be changed, the change is specified by the relay PC. Then the specification result is reported to the anchor PC. Under these circumstances, the anchor PC only needs to record the relay PC where the MS is located. When a paging to the MS is needed, the anchor PC informs the relay PC according to the recorded relay PC ID of the latest location updating of the MS. Therefore, the relay PC knows very clearly the situation of the paging groups managed by itself. Moreover, if a paging group is possibly managed by multiple relay PCs, a relay PC managing the paging group will be configured with the IDs of other relay PCs which also manage the paging group. In this process, when the anchor PC needs to page the MS, after the paging message is sent to the relay PC on which the latest location updating occurs, the relay PC determines whether the paging group is managed by neighboring relay PCs according to the paging group information of the MS. If the paging group is managed by neighboring relay PCs, the paging is performed on BSs in the paging group, and the neighboring relay PCs are informed to page the BSs in the paging group.

The above process reduces the number of the paging groups managed by the anchor PC, that is, each PC manages certain specific paging groups. As a paging group may be managed by several PCs, each PC needs to configure not only the information about the BSs in the paging groups managed by the PC, but also the information about neighboring PCs of the paging groups managed by the PC.

In the above process, when the MS moves to a paging group that is not originally managed by the anchor PC, the anchor PC is changed to the current relay PC if necessary, i.e., the current relay PC is changed to the anchor PC of the MS during the location updating. In other words, when the MS updates its location in paging group6, PC2 may be changed to be the anchor PC of the MS.

Another possibility also existing in the above structure of the paging group network is that, only one PC controls the related information, which may be seen as an overlapping of the relay PC and anchor PC. In this situation, the functions of the relay PC and anchor PC are integrated.

Figure 4:
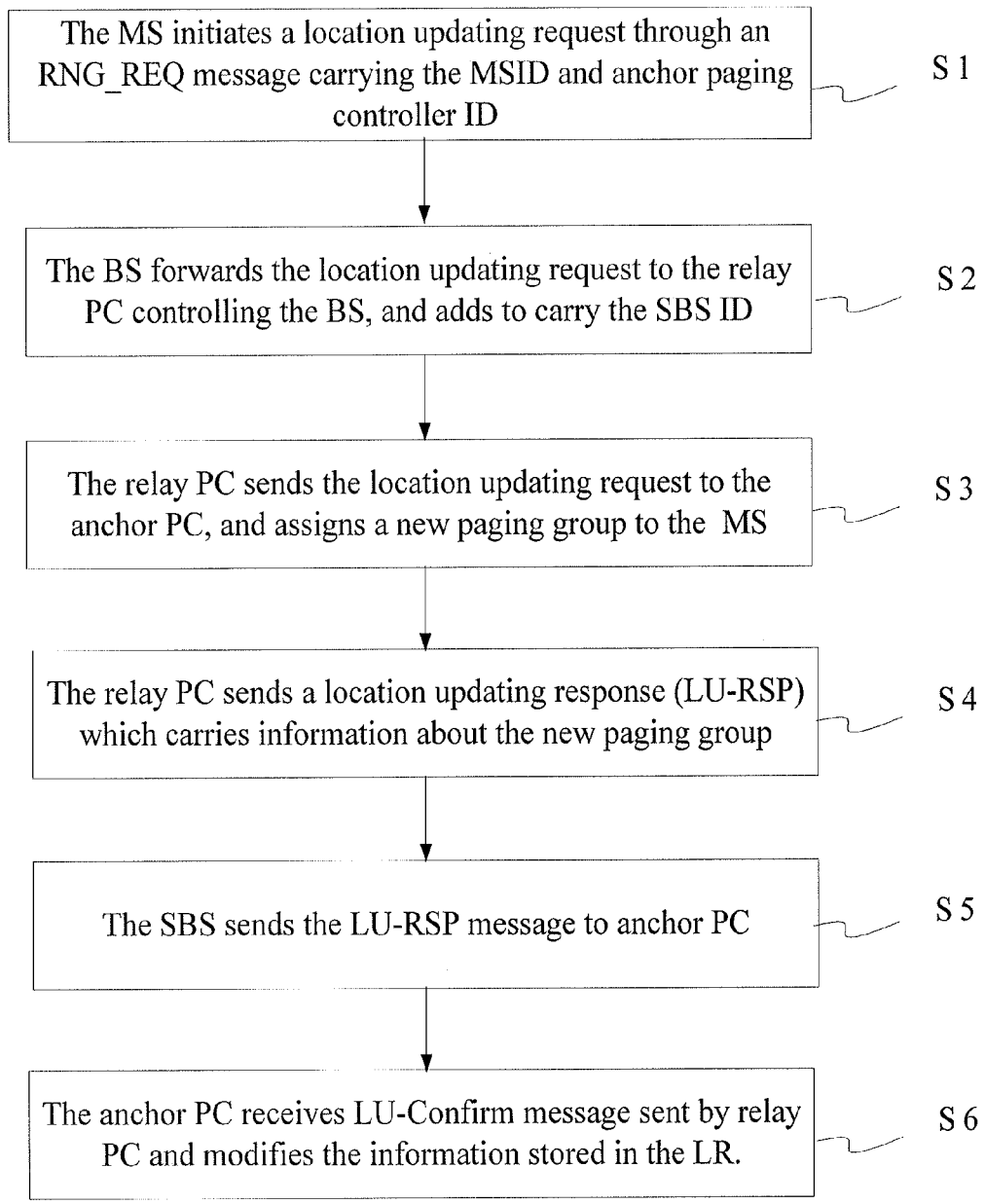
FIG. 4 is a schematic flow chart illustrating how an MS switches between different paging groups according to an embodiment of the present invention.

FIG. 4 is a schematic flow chart illustrating how an MS switches between different paging groups according to an embodiment of the present invention. According to the above scheme of the paging group network, the location updating process is shown in FIG. 4.

Step S1, the MS initiates a location updating request through a ranging request (RNG_REQ) message carrying a mobile station ID (MS ID) and an anchor paging controller (PC) ID.

When the MS needs to perform the location updating, the MS initiates the location updating request through the RNG_REQ message carrying the MS ID and the anchor PC ID. The anchor PC ID is adapted to address the location information of the anchor PC which stores MS context information when the MS enters the idle mode.

Step S2, the location updating request carrying a serving BS ID is forwarded by the BS to the relay PC managing the BS.

In the embodiment of the present invention, the relay PC manages the paging group in which the MS is located. Therefore, the BS firstly forwards the location updating request to the relay PC managing the BS. The location updating request carries the MS ID, and/or the anchor PC ID, and/or the relay PC ID, and further carries the serving BS ID.

Figure 5A:
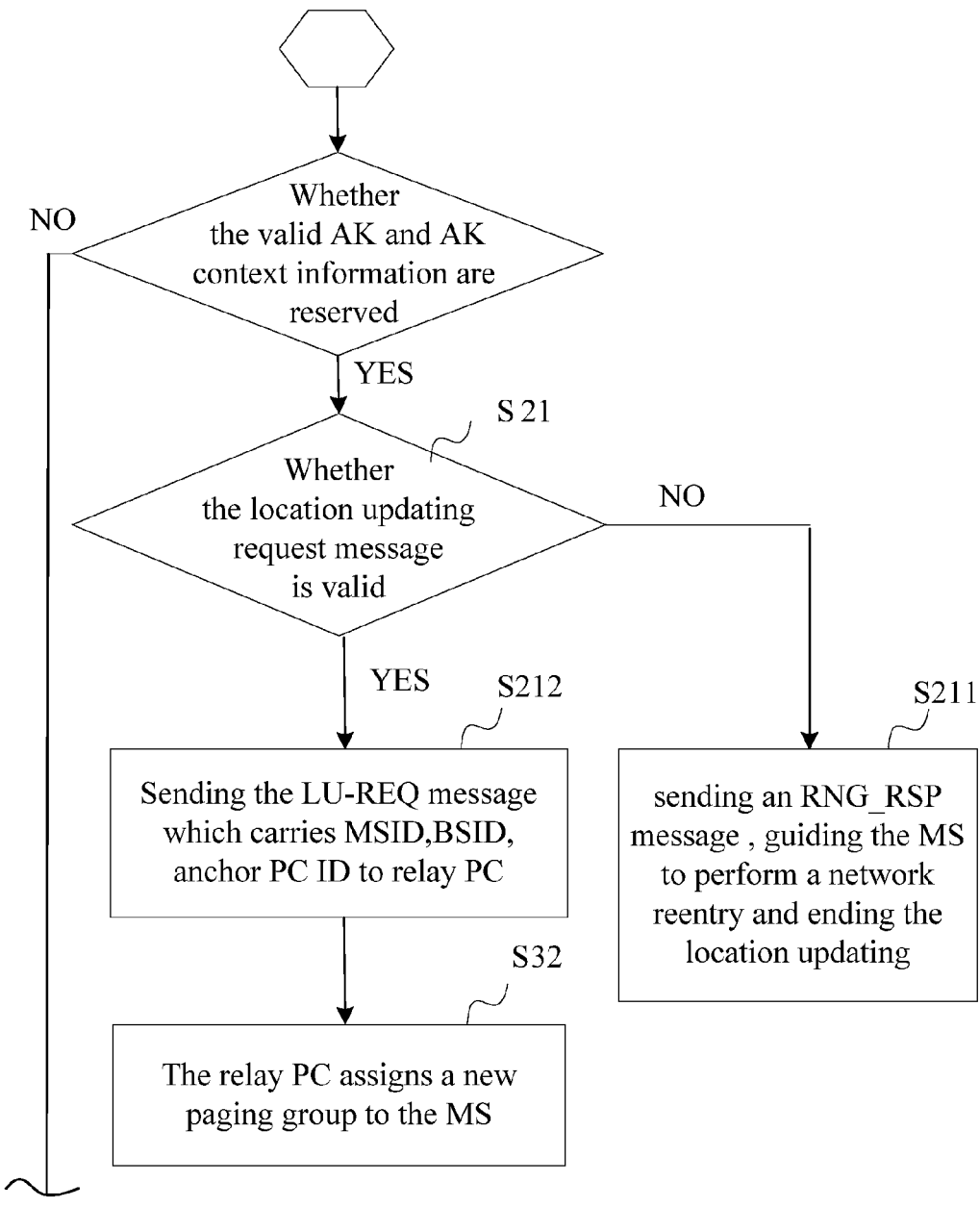
FIGS. 5A and 5B are a detailed flow chart illustrating steps S2 and S3 according to an embodiment of the present invention.
Figure 5B:
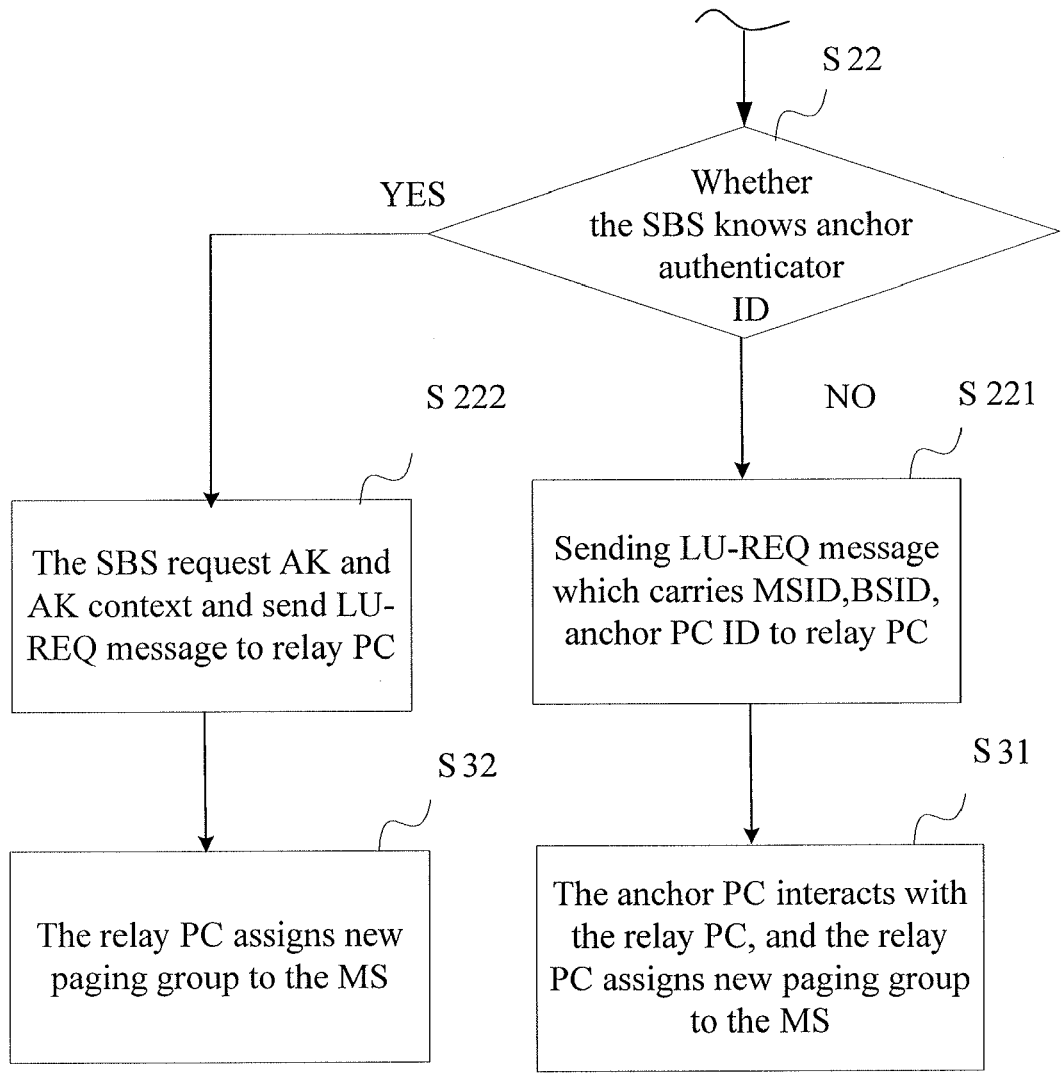

FIG. 5 is a detailed flow chart illustrating steps S2 and S3 according to an embodiment of the present invention. As shown in FIG. 5, step S2 further includes determining whether the serving BS reserves valid authentication information according to the location updating request received by the serving BS. The valid authentication information includes a valid authorization key (AK), AK context information, or an anchor authenticator ID of the MS. If the serving BS reserves valid authentication information, step S21 is performed; if the serving BS does not reserve valid authentication information, step S22 is performed.

Step S21, whether the location updating request is valid is determined. If the location updating request is invalid, step S211 is performed; if the location updating request is valid, step S212 is performed.

Step S211, an RNG_RSP message carrying an unsafe location updating indication is sent; the MS is guided to perform a network reentry and end the location updating.

Step S212, an LU-REQ message is sent to a serving ASN GW, and the serving ASN GW forwards the LU-REQ message to the ASN GW in which the relay PC is located. The LU-REQ message carries the MS ID, BS ID and anchor PC ID.

Step S22, whether the serving BS knows the information about the anchor authenticator ID of the MS is determined. If the serving BS does not know the information about the anchor authenticator ID of the MS, step S221 is performed; if the serving BS knows the information about the anchor authenticator ID of the MS, step S222 is performed.

Step S221, if the serving BS does not know the authentication information of the MS, the serving BS sends the LU-REQ message to the serving ASN GW. The serving ASN GW forwards the LU-REQ message to the ASN GW in which the RPC is located. The LU-REQ messages carry MS ID, BS ID, and/or anchor PC ID, and/or relay PC ID, and further carry an instruction to inform the MS of the authentication information.

Step S222, if the serving BS knows the information about the anchor authenticator ID of the MS, the serving BS directly sends an AK-request message to the ASN GW in which the anchor authenticator is located, and requests the AK and AK context of the MS. The AK-request message carries the MS ID and BS ID. After receiving the AK-request message, the anchor authenticator generates a new AK and AK context for the MS, and sends the new AK and AK context to the serving BS through an AK-transfer message. After verifying the AK and AK context, the serving BS sends a location updating request LU-REQ message to the ASN GW in which the RPC is located. In addition, the LU-REQ messages carry MS ID, BS ID, and/or anchor PC ID, and/or relay PC ID.

Step S3, the relay PC sends the location updating request to the anchor PC, and assigns a new paging group to the MS.

In this step, the ASN GW in which the relay PC is located forwards the location updating request to the ASN GW in which the anchor PC is located, and the forwarded message carries the relay PC ID cell.

Step S31, if step S221 is performed in step S2, after the anchor PC sends information to the relay PC, the relay PC assigns the new paging group to the MS. The details are shown below.

After the anchor PC receives the location updating request, the ID information of the relay PC in which the MS is located is recorded, and the authentication information of the MS is found from an anchor LR associated with the anchor PC. Then, a location updating response (LU-RSP) message is replied to the ASN GW in which the relay PC is located. The LU-RSP messages carry MS ID, BS ID, and/or anchor PC ID, and/or relay PC ID and anchor authentication ID. (In this step, the anchor PC may also directly inform the anchor authenticator to generate a new AK and AK context for the MS. Thus, the LU-RSP message may directly carry the generated AK and AK context instead of the anchor authenticator ID. The above scheme is adopted when the anchor PC and the anchor authenticator exist in the same physical entity or in different physical entities. For the latter situation, the anchor PC requests the AK and AK context from the anchor authenticator of the MS before replying the location updating response to the relay PC). After receiving the LU-RSP message sent by the anchor PC, the relay PC is responsible for managing the paging groups within its management domain according to the configuration of the paging groups (i.e., the management mode of the paging groups of the present invention), and assigns the new paging group to the MS. Thus, the paging group ID is obtained. In this process, the relay PC needs to change the paging parameters, namely, the paging cycle and paging offset of the MS at the same time according to the rules of the relay PC. At this time, the LU-REQ message sent to the anchor PC by the relay PC further carries the new paging group ID assigned to the MS, the new paging cycle and the new paging offset, where the relationship between these three parameters is "or". In addition, if only the paging group is changed, the LU-REQ message only carries the paging group ID; and if all the parameters are changed, the LU-REQ message carries all of the three parameters.

Step S32, if steps of S212 and S222 are performed in step S2, the relay PC is responsible for managing the paging groups within its management domain according to the configuration of the paging groups (i.e., the management mode of the paging groups of the present invention), and assigns the new paging group to the MS. Thus, the paging group ID is obtained. In this process, the relay PC needs to change the paging parameters, namely, the paging cycle and paging offset of the MS at the same time according to the rules of the relay PC. At this time, the LU-REQ message sent to the anchor PC by the relay PC further carries the new paging group ID assigned to the MS, the new paging cycle and the new paging offset, where the relationship between these three parameters is "or". In addition, if only the paging group is changed, the LU-REQ message only carries the paging group ID; and if all the parameters are changed, the LU-REQ message carries all of the three parameters.

After receiving the location updating request sent from the relay PC, the anchor PC reserves the content of the LU-REQ message, for example, parameters such as paging group ID, paging cycle, and paging offset set by the relay PC for the MS and the relay PC ID.

Then, the anchor PC sends the LU-RSP message carrying the MS ID, anchor PC ID, relay PC ID and BS ID to the relay PC.

Step S4, the relay PC sends the LU-RSP carrying the information about the new paging group to the serving BS.

The ASN GW in which the relay PC is located forwards the LU-RSP message to the serving ASN GW of the serving BS in which the MS currently is located. The message carries the parameters such as the MS ID, the new paging group ID assigned to the MS, paging cycle possibly newly set and paging offset.

Step S5, the serving BS sends the LU-RSP message to the anchor PC.

The serving ASN GW forwards the LU-RSP message to the serving BS. After receiving the LU-RSP message, the serving BS further performs the following determining.

If this step is performed directly after step S31, and if the LU-RSP message carries the information about the anchor authenticator ID, the serving BS sends an AK-request message to the ASN GW in which the anchor authenticator is located, and requests to generate the AK and AK context. The anchor authenticator returns the AK and AK context to the serving BS through the AK-transfer. After obtaining the AK and AK context, the serving BS verifies the RNG-REQ message. If the verifying result is positive, the serving BS replies a ranging response (RNG_RSP) message indicating the success of the location updating to the MS. In addition, the RNG_RSP message carries the new paging group ID and the information about the anchor PC ID. If the verifying result is negative, the RNG_RSP carries a failure indication, and guides the MS to perform network reentry. Afterward, a location updating confirmation (LU-Confirm) message is replied to the relay PC, and the LU-Confirm message carries the location updating success or failure indication. After receiving the LU-Confirm message, the relay PC further replies the LU-Confirm message to the anchor PC. If the location updating is successful, the message carries parameters such as the MS ID, relay PC ID, BS ID, the paging group ID newly assigned by the relay PC to the MS in Step 4a, paging offset and paging cycle.

If this step is performed directly after step S32, the serving BS packages the obtained parameters such as the paging group ID, paging cycle, and paging offset in the RNG_RSP message, and replies to the MS according to definitions in IEEE802.16e. Meanwhile, the serving BS replies the LU-Confirm message indicating the location updating confirmation to the ASN GW in which the relay PC is located. In addition, the LU-Confirm message carries the success or failure indication.

Step S6, on receiving the LU-Confirm message sent from the relay PC, the anchor PC modifies the information stored in the LR.

After the anchor PC receives the LU-Confirm message sent from the relay PC, if the location updating confirmation is successful, the anchor PC stores the obtained information which includes the new BS ID of the BS in which the MS belongs, the paging group ID, the relay PC ID of the relay PC to which the MS located, the paging offset, and the paging cycle in the associated LR. If the location updating fails, the above obtained information will be deleted.

Another situation existing in the above location updating process is that, if the relay PC knows that the serving BS may obtain the authentication information required for verifying the location updating request of the MS from the received location updating request, for example, the anchor authenticator ID or valid AK and AK context of the MS, the relay PC directly assigns a new paging group to the MS, and replies the location updating response to the serving BS. The location updating response carries the new paging group ID, and/or paging cycle, and/or paging offset.

After receiving the LU-Confirm message sent from the relay PC, the serving BS replies the location updating response to the MS, and replies the LU-Confirm message to the relay PC. The LU-Confirm message carries an indication of whether the location updating is successful. After the relay PC receives the LU-Confirm message sent by the serving BS, if the location updating is successful, the relay PC interacts with the anchor PC, and sends the LU-Confirm message. The LU-Confirm message sent by the relay PC and received by the anchor PC further includes the paging group ID newly assigned by the relay PC to the MS, and/or paging cycle, and/or paging offset. If the location updating fails, the original information stored in the LR before operating the location updating is reserved.

In this process, the anchor PC only interacts with the relay PC in the location updating confirmation process to obtain the result of the MS location updating. The processing before the location updating confirmation is performed by the relay PC.

The embodiments of the present invention clarify the method for managing the paging groups and PCs, optimize the paging and location updating processes, and reduce the complexity of managing the idle mode.

Those in the art may make modifications and variations without departing from the spirit and scope of the present invention. Therefore, these modifications and variations made based on the claims and equivalent techniques of the present invention fall within the scope of the present invention.

The invention claimed is:

1. A method for updating mobile station (MS) locations, comprising:

receiving, by a relay paging controller (PC) controlling an serving base station (BS), an MS location updating request from the serving BS of an MS;

interacting, by the relay PC, the location updating request with an anchor PC, and assigning, by the relay PC, a new paging group to the MS;

sending, by the relay PC, a location updating response carrying the new paging group information to the serving BS.

2. The method according to claim 1, wherein the location updating request is initiated by the MS to the serving BS, and a mobile station ID and an anchor PC ID are carried in the location updating request.

3. The method according to claim 1, wherein in the location updating request received by the relay PC carries a serving BS ID.

4. The method according to claim 1, further comprising:

determining, by the serving BS, whether a valid authorization key (AK) and AK context information or an anchor authenticator ID of the MS are stored;

sending, by the serving BS, the MS location updating request to the relay PC controlling the serving BS.

5. The method according to claim 4, further comprising:

if the serving BS stores the valid AK and the AK context information or the anchor authenticator ID information of the MS, verifying the validity of the location updating request of the MS, if the location updating request is invalid, guiding, by the serving BS, the MS to reenter the network; and if the location updating request is valid, forwarding the location updating request to the relay PC.

6. The method according to claim 4, wherein the determining, by the serving BS, whether a valid authorization key (AK) and AK context information or anchor authenticator ID information are stored further comprises:

if the serving BS stores the valid AK and the AK context information or the anchor authenticator ID information, carrying a verification completion indication in the location updating request; otherwise, a verification incompletion indication being carried in the location updating request.

7. The method according to claim 1, wherein the interacting, by the relay PC, the location updating request with an anchor PC, and assigning, by the relay PC, a new paging group to the MS further comprises the relay PC assigning a new paging group to the MS;

wherein the relay PC assigning the new paging group to the MS further comprises:

receiving, by the anchor PC, the location updating request, replying a location updating response carrying the MS ID, a base station ID (BS ID), and/or the anchor PC ID, and/or the relay PC ID to the relay PC; and receiving, by the relay PC, the location updating response, and assigning the new paging group to the MS.

8. The method according to claim 7, comprising:

in the receiving, by the anchor PC, the location updating request, replying a location updating response carrying the MS ID, a base station ID (BS ID), and/or the anchor PC ID, and/or the relay PC ID to the relay PC, if the serving BS does not complete the verification of the location updating request of the MS, an authentication information is carried in the location updating response;

in the sending, by the relay PC, a location updating response carrying the new paging group information to the serving BS, the authentication information is carried in the location updating response.

9. The method according to claim 7, wherein assigning, by the relay PC, a new paging group to the MS comprises:

assigning, by the relay PC, the new paging group to the MS;

sending, by the relay PC, the location updating request carrying information about the new paging group assigned to the MS to the anchor PC;

sending, by the anchor PC, the location updating response carrying the MS ID, the BS ID, and/or the anchor PC ID, and/or the relay PC ID to the relay PC.

10. The method according to claim 8, comprising:

if the anchor PC and an anchor authenticator are realized in the same physical entity, the carried authentication information are the AK and the AK context adapted to verify the MS by the serving BS;

requesting, by the anchor PC, the AK and the AK context of the MS from the anchor authenticator;

if the anchor PC and the anchor authenticator are realized in different physical entity, the carried authentication information is ID information of the anchor authenticator serving the MS.

11. The method according to claim 1, wherein between the sending, by the relay PC, a location updating response carrying the new paging group information to the serving BS and the modifying, by the anchor PC, the information stored in a location register (LR) according to a result of location updating, the method further comprises:

sending, by the serving BS, a location updating confirmation message to the relay PC.

12. The method according to claim 11, wherein the sending, by the serving BS, a location updating confirmation message to the relay PC further comprises:

before the serving BS sends the location updating confirmation message to the relay PC, verifying, by the serving BS, the validity of the location updating request sent by the MS;

wherein the verifying, by the serving BS, the validity of the location updating request sent by the MS comprises:

if the authentication information obtained by the serving BS is the AK and the AK context of the MS, verifying, by the serving BS, the location updating request sent by the MS, by adopting the authentication information; and if the authentication information obtained by the serving BS is the ID information of an anchor authenticator of the MS, requesting, by the serving BS, the AK and AK context of the MS from the anchor authenticator, and verifying the location updating request sent by the MS.

13. The method according to claim 11, wherein in the sending, by the serving BS, a location updating confirmation message to the relay PC further comprises:

sending, by the serving BS, the location updating response to the MS, and informing information about a location updating result.

14. The method according to claim 13, wherein in the sending, by the serving BS, a location updating confirmation message to the relay PC, if the location updating is successful, the new information about the paging group and the anchor PC ID is carried in the location updating response.

15. The method according to claim 6, wherein in the sending, by a serving base station (BS), an MS location updating request to a relay paging controller (PC) controlling the serving BS, if the relay PC knows that the serving BS completes verifying the location updating request of the MS in the received location updating request, in the interacting, by the relay PC, the location updating request with an anchor PC, and assigning a new paging group to the MS, the relay PC assigns the new paging group to the MS, and replies the location updating response carrying a newly assigned paging group ID, and/or a paging cycle, and/or a paging offset to the serving BS.

16. The method according to claim 15, further comprising:

modifying, by the anchor PC, the information stored in a location register (LR) according to a result of location updating;

wherein in the modifying, by the anchor PC, the information stored in a location register (LR) according to a result of location updating, the location updating confirmation message sent by the relay PC and received by the anchor PC further comprises the paging group ID newly assigned by the relay PC to the MS, and/or the paging cycle, and/or the paging offset.

17. A relay paging controller (PC) controlling a serving base station (BS), comprising:

a first unit, configured to receive an MS location updating request from the serving BS of an MS;

a second unit, configured to interact the location updating request with an anchor PC, and assign a new paging group to the MS;

a third unit, configured to send a location updating response carrying the new paging group information to the serving BS.

18. A system for updating mobile station (MS) locations, comprising:

a relay paging controller (PC) controlling an serving base station (BS), adapted to receive an MS location updating request from the serving BS of an MS, interact the location updating request with an anchor PC, assign a new paging group to the MS, and send a location updating response carrying the new paging group information to the serving BS; and the anchor PC, adapted to modify the information stored in a location register (LR) according to a result of location updating.

* * * * *